United States Patent [19]
Jacobs, Jr.

[11] Patent Number: 5,553,562
[45] Date of Patent: Sep. 10, 1996

[54] DOUBLE MAST ICEBOAT

[76] Inventor: John F. Jacobs, Jr., 16169 Anstell Ct., Mt. Clemens, Mich. 48044

[21] Appl. No.: 458,362
[22] Filed: Jun. 2, 1995
[51] Int. Cl.⁶ ................................................ B62B 15/00
[52] U.S. Cl. ................................................ 114/43; 114/39.1
[58] Field of Search ..................... 114/39.1, 43; 280/213

[56] References Cited

U.S. PATENT DOCUMENTS

| 3,109,665 | 11/1963 | Remmen | 280/16 |
|---|---|---|---|
| 3,395,664 | 8/1968 | Greenberg et al. | 114/39.1 |
| 3,991,694 | 11/1976 | Black | 114/39.1 |
| 3,998,175 | 12/1976 | Pless | 114/39.1 |
| 4,408,772 | 10/1983 | Hollwarth | 114/43 |
| 4,723,498 | 2/1988 | Stampe | 114/102 |
| 4,777,897 | 10/1988 | McKenna | 114/39.1 |
| 4,819,574 | 4/1989 | Westerman | 114/39.1 |
| 5,054,410 | 10/1991 | Scarborough | 114/39.1 |
| 5,088,431 | 2/1992 | Pizzey | 114/39.1 |
| 5,134,950 | 8/1992 | Berté | 114/39.1 |

FOREIGN PATENT DOCUMENTS 2457215  12/1980  France.

Primary Examiner—Sherman Basinger
Attorney, Agent, or Firm—Young and Basile, P.C.

[57] ABSTRACT

An iceboat includes a hull and a perpendicular extending plank attached to the rear end of the hull. Side struts extend from outer ends of the plank to the forward portion of the hull. A mast is mounted on each side strut at a position rearward of the occupant cockpit in the hull and supports a sail. Skates are attached to the front end of the hull and to the outer ends of the plank.

11 Claims, 5 Drawing Sheets

DOUBLE MAST ICEBOAT

BACKGROUND OF THE INVENTION

1. Field of the Invention

The present invention relates, in general, to sailboats and, more specifically, to iceboats.

2. Description of the Art

Iceboats have proven to be a popular type of sailing craft in colder climates. An iceboat typically includes a small, elongated hull, a plank connected to the rear end of the hull and extending outward from the hull, and three runners or skates, one mounted on a springboard extending forwardly of the front end of the hull and one on each outer end of the plank. A sail is mounted on a mast and a boom attached to the mast in much the same manner as on a sailboat. The mast is located in front of the forward end of the cockpit in the hull.

However, the forward mounted mast places the sail in a location generally in front of and to the side of the occupant in the cockpit which has a tendency to block the view to one side of the iceboat. This could result in a dangerous situation, particularly due to the high speeds of iceboats as compared to the much slower sailboats in water.

The sail, as in a sailboat, generates forces on the hull. Thus, the hull must be large and strong enough for the particular class sail to support the forces generated by the mast and sail.

Double masted sailboats have been devised in which two main sails are mounted on a multi-hull boat, such as a catamaran or a trimaran. A mast is mounted on each outboard hull.

It would be desirable to provide a double mast iceboat which presents a unique design for an iceboat. It would also be desirable to provide a double mast iceboat which positions the sails and masts substantially behind the occupant of the iceboat for better visibility. It would also be desirable to provide a double mast iceboat in which the sail/mast position provides a weight distribution which makes it easier to turn the iceboat than in previous iceboats. It would also be desirable to provide a double mast iceboat which enables both sails to be shorter in height and narrower in overall length as compared to a conventional single sail mounted on prior iceboats so as to reduce hiking and load forces on the hull thereby enabling the hull size and weight to be reduced over previously devised iceboats.

SUMMARY OF THE INVENTION

The present invention is an iceboat having two masts which provide unique advantages over previously devised iceboats.

The present iceboat includes a hull having forward and rearward ends, and a plank attached to the rear end of the hull and having first and second opposed ends extending outwardly from opposite sides of the hull. A plurality of skates are attached to the hull with one skate attached to the front end of the hull and one skate attached to each of the first and second ends of the plank.

First and second struts extend from a fixed mount on the forward end of the hull to the first and second ends of the plank, respectively. A mast carrying a sail is mounted on each strut.

An aperture with front and rear ends is formed in the hull to form an occupant cockpit. Preferably, each mast is mounted on one of the struts at a position rearward of the front end of the aperture in the hull. This moves the center of forces applied by the sails and masts to the hull toward the rear of the hull thereby providing greater maneuverability and ease of turning of the front skate. Further, since this mast position is rearward of the front end of the cockpit, the occupant has an enlarged view forward and sideward of the masts. This view is not blocked by the sail as in previously constructed iceboats.

Preferably, one of the masts is angled toward the other mast to form an acute angle with respect to the strut on which it is mounted. A compression strut may be movably attached to the mast at a position above the hull to maintain the masts in the described angled arrangement.

Trim lines are connected at one end to each of the mast booms and are joined together at opposite ends to provide simultaneous and identical sail positioning.

The double mast iceboat of the present invention provides unique advantages not previously provided in prior art constructed iceboats. The unique double mast enables shorter height and length sails to be employed. This enables the sails to form a more efficient air foil which exerts less force on the hull. As a result, a smaller, lighter weight hull can be employed since the hull is not required to support the large forces normally imposed by a single large sail. Further, the rearward mounting of the masts and sails moves the center of forces exerted on the hull toward the rear of the hull thereby enabling easier maneuverability of the front skate of the iceboat. Finally, the mounting of the two masts toward the rear of the hull provides the occupant with a greater unobstructed view forward of the iceboat. This view is not blocked by a single sail as in previous iceboat constructions.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

Figure 1:
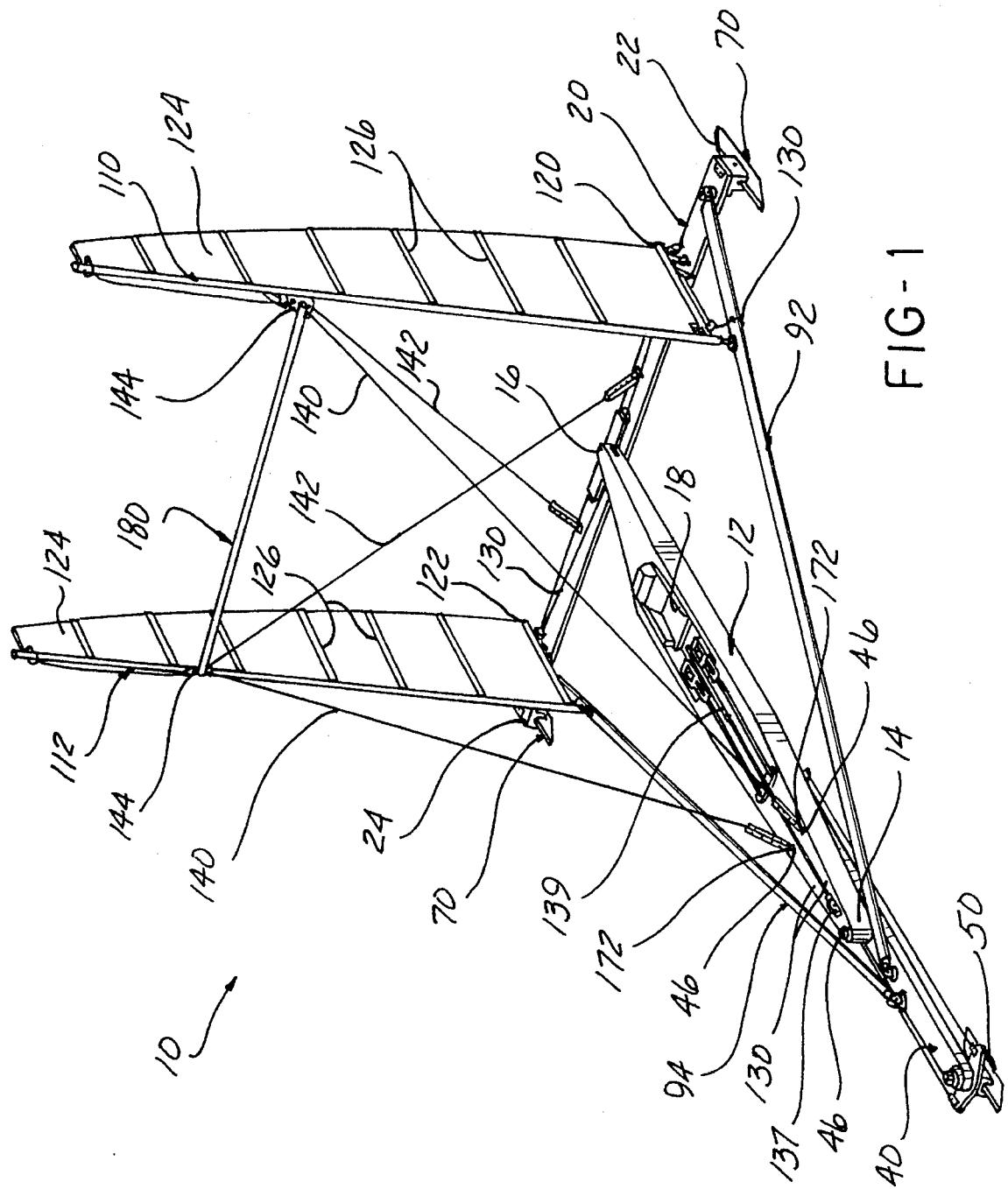
FIG. 1 is a perspective view of a double mast iceboat constructed in accordance with the teachings of the present invention.
Figure 2:
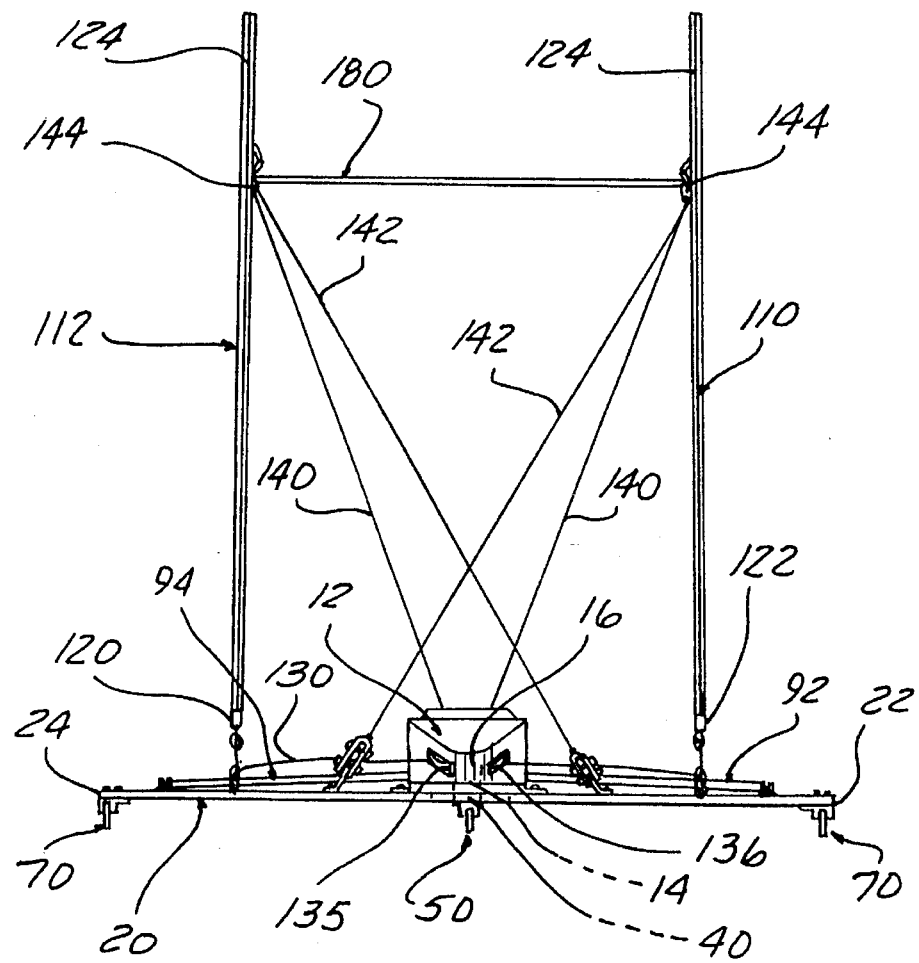
FIG. 2 is a rear elevational view of the iceboat of the present invention shown in FIG. 1.

Referring now to the drawing, and to FIGS. 1 and 2 in particular, there is depicted a double mast iceboat 10 which provides unique features not previously found in iceboats.

As shown in FIGS. 1 and 2, the double mast iceboat 10 includes an elongated hull or fuselage 12 having a forward end 14 and a rear end 16. The hull 12 is formed of a suitable lightweight, marine type material and generally has a narrow, low height aerodynamic shape with the sides and top surface tapering from the narrow front and rear ends 14 and 16 to a slightly larger central area. An aperture 18 is formed in the central area of the hull 12 and opens to a cockpit within the hull 12 sized to receive at least one occupant. As shown in FIG. 1, the aperture 18 is located closer to the rear end 16 than the forward end 14 of the hull 12.

Figure 3:
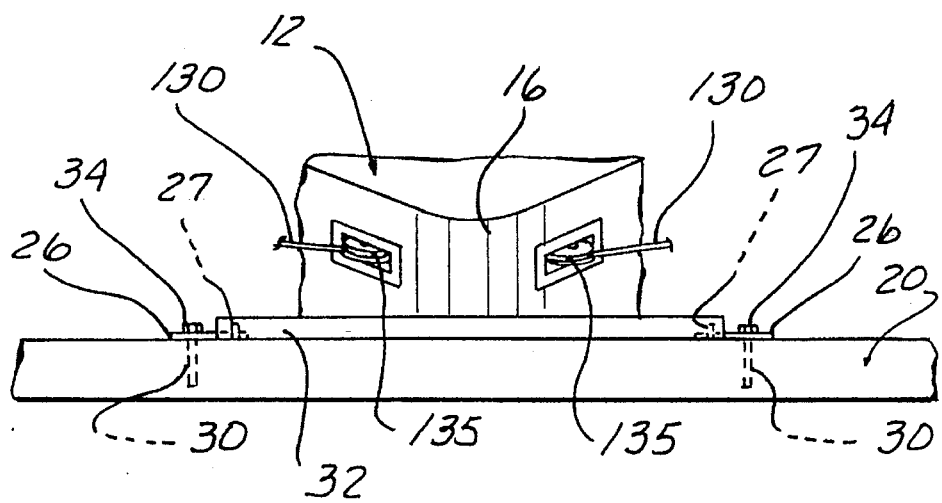
FIG. 3 is an enlarged, partial rear view showing the mounting of the plank to the hull of the present iceboat.

The central portion of an elongated, planar plank 20 is fixedly connected to the rear end 16 of the hull 12 as shown in FIGS. 2 and 3. Two shear plates 26, preferably formed of a stainless steel, are secured by fasteners, such as screws 27, to opposite ends of a wood beam 32 which is adhesively fixed to the rear end 16 of the hull 12. An end of each shear plate 26 extends outwardly from an end of the beam 32 and has an aperture formed thereon. A threaded fastener 34 extends through the aperture in each shear plate 26 into the plank 20 to attach the rear end 16 of the hull 12 to the plank 20.

Figure 4:
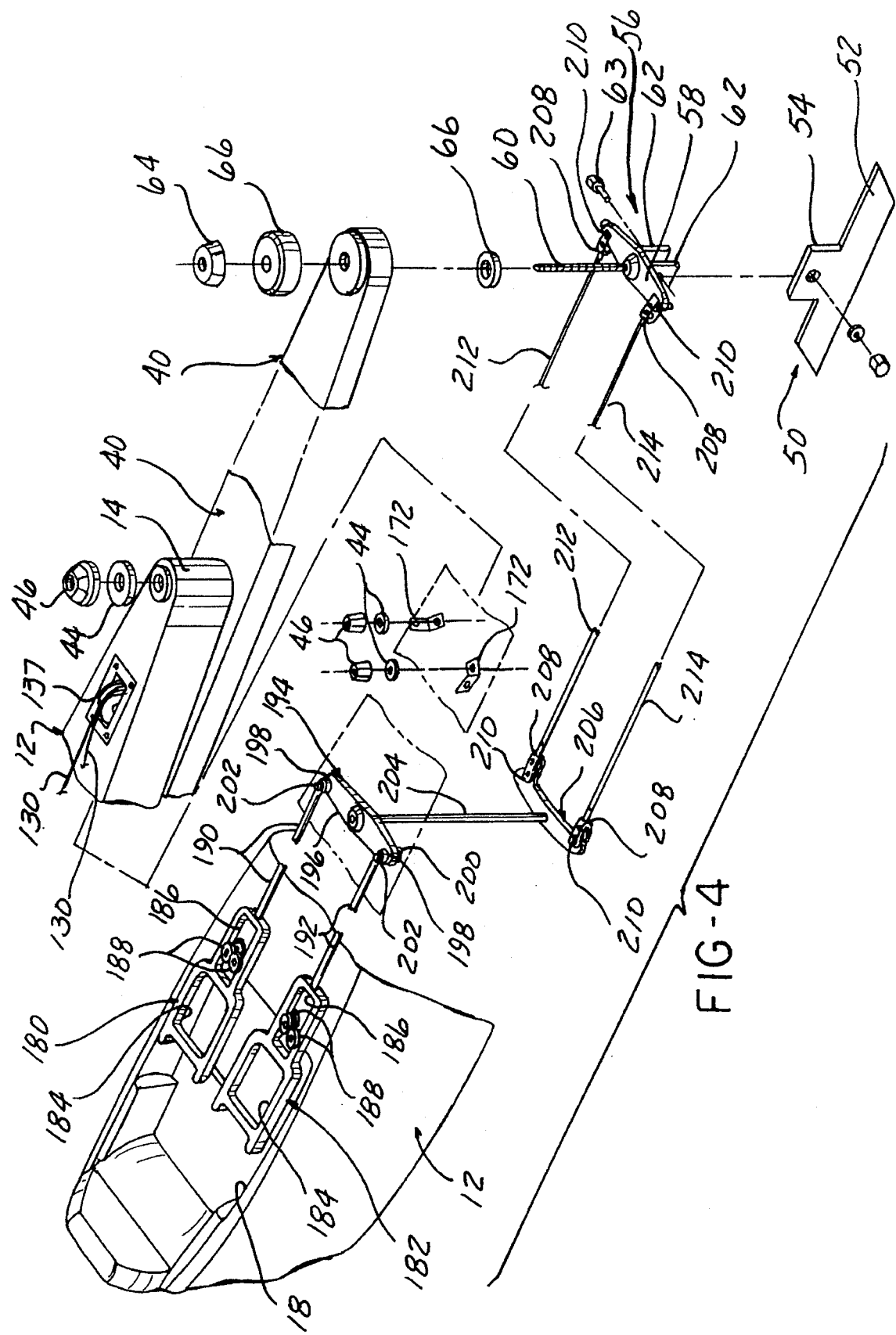
FIG. 4 is an exploded, perspective view illustrating the springboard, front skate and front skate steering linkage.

A flexible spring board 40 is attached to and extends forwardly of the forward end 14 of the hull 12 as shown in FIG. 1, and in greater detail in FIG. 4. One end of the springboard 40 is attached to the forward end 14 of the hull 12, preferably at three spaced locations, by means of elongated bolts, each of which receives a washer 44 and a nut 46 thereover. The bolts extend completely through the hull 12 and out through the top of the hull 12.

The opposite or outermost end of the springboard 40 projecting forwardly of the forward end 14 of the hull 12 carries a front skate or runner 50. The front skate 50 is formed with a thin, elongated blade 52. An enlarged block 54 projects integrally upward from a top surface of the blade 52 and has a through bore extending laterally therethrough.

A front chock 56 is formed of a generally planar, arm-like base 58 from one side of which projects a threaded stud 60 welded to the base 58. A pair of spaced legs 62 project from the opposite surface of the base 58 and are spaced apart to engage opposite sides of the enlarged block 54 on the blade 52. Apertures in the legs 62 are alignable with the through bore in the block 54 on the blade 52 to receive a bolt 63 therethrough to attach the blade 52 to the front chock 56. A pair of wear plates 66 are disposed immediately adjacent opposite sides of the springboard 40 prior to engagement of the threaded stud 60 to a nut 64. The threaded stud 60 extends through an aperture at the fowardmost end of the springboard 40 and receives the nut 64 to mount the front skate 50 to the springboard 40.

FIG. 4 also depicts a steering means connected to the front chock 58. A pair of foot pedals 180 and 182 are mounted over the hull 12 adjacent the forward end of the cockpit opening 18. Each foot pedal 180 and 182 includes a foot receiving aperture 184 sized to receive one of the user's feet. A slot 186 is formed in each foot pedal 180 and 182 and slides about a pair of guide posts 188 fixedly mounted to and extending upward from the upper surface of the hull 12. The slot 186 and the guide posts 188 interact to control the sliding, bi-directional reciprocating movement of each foot pedal 180 and 182.

A steering tube 190 is fixedly connected to and extends axially from one end of the foot pedal 180. A similar steering tube 192 projects axially from the other foot pedal 182. Each steering tube 190 and 192 is preferably formed of a hollow, metallic tubular member which has an opposite end flattened for connection to an upper steering arm 194. The upper steering arm 194 is in the form of a planar member which is pivotally connected to the hull 12 by means of a suitable fastener 196, such as a bolt extending through the top surface of the hull 12. A disk-spacer 198 is disposed between the flattened end of each steering tube 190 and 192 and each opposed end of the upper steering arm 194. A threaded bolt 200 extends through apertures in the ends of the upper steering arm 194, each spacer 198, and the flattened end of the steering tube 190 or 192 and is fixed in place by means of a nut and washer, both denoted by reference number 202.

An elongated rod 204 is fixedly connected at one end, such as by welding, to the upper steering arm 194 and projects through the hull 12 to an opposite end disposed exteriorly of the bottom of the hull 12. The other end of the rod 204 is fixedly connected, such as by welding, to a lower steering arm 206.

The lower steering arm 206 is formed substantially identical to the upper steering arm 194 and preferably is in the form of a planar member having opposed ends. Each end of the lower steering arm 206 receives a forked swage fitting 208 which is pivotally connected to one end of the lower steering arm 206 by means of a clevis pin 210 having a spring loaded ball at one end for locking the pin 210 in position through aligned apertures in the swage fitting 208 and each end of the lower steering arm 206.

A pair of steering cables 212 and 214 extend from a fixed connection at one end to one of the swage fittings 208 attached to the lower steering arm 206 to a fixed connection in an identical, opposite swage fitting 208 at an opposite end. Each of the opposite swage fittings 208 is pivotally connected to the front chock 58 by means of a clevis pin 210.

The front chock steering mechanism is designed to transmit bi-directional sliding movement of either of the foot pedals 180 and 182 to a corresponding pivotal movement of the front skate 52. For example, a rearward sliding movement of the foot pedal 180 accompanied with a forward sliding movement of the opposite foot pedal 182 will cause a pivotal movement of the upper and lower steering arms 194 and 206, as well as a pivotal movement of the front chock 56 in a direction to pivot the front skate 52 counterclockwise thereby executing a left turn. An opposite reciprocation of the foot pedals 180 and 182 causes a right turn of the iceboat 10. Movement of the foot pedals 180 and 182 into alignment with each other will center the front skate 52 for straight forward motion of the iceboat 10.

Figure 5:
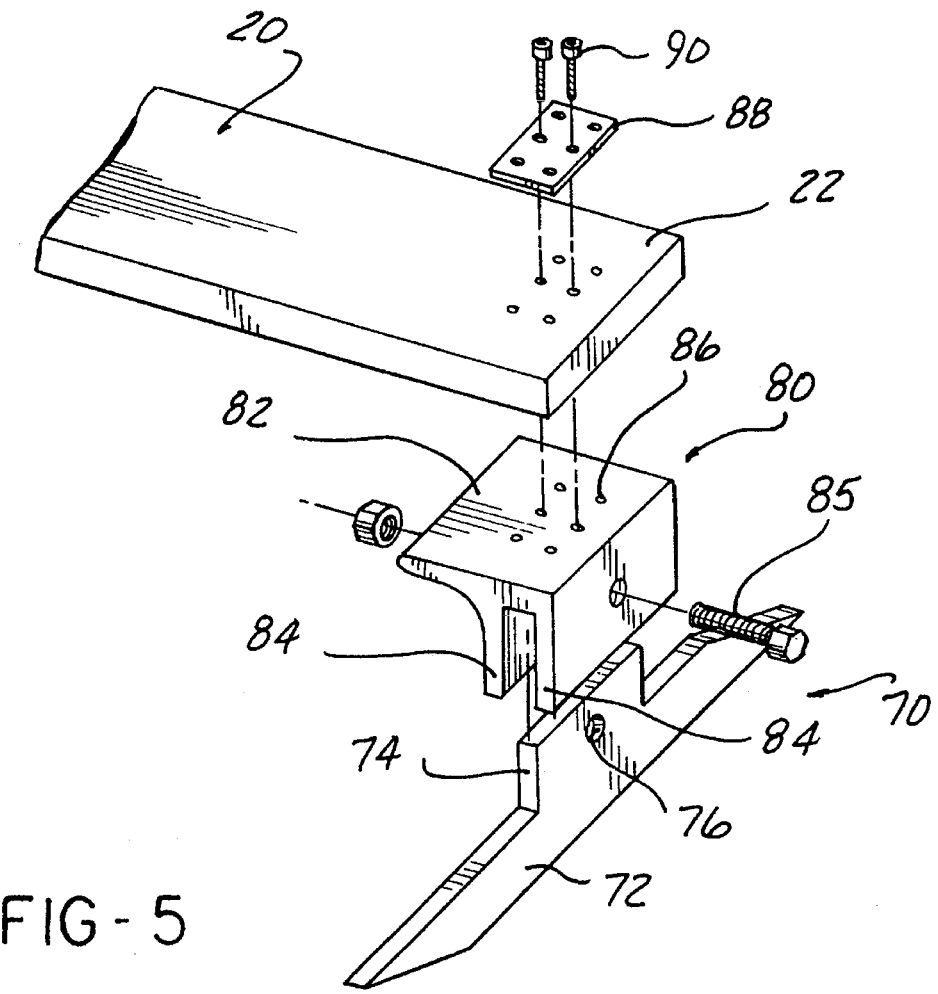
FIG. 5 is an exploded, perspective view showing the mounting of one of the rear skates to the outer end of the plank.

The rear pair of skates 70, only one of which is shown in detail in FIG. 5, are also each formed of a thin, blade 72 having an enlarged block 74 integrally formed at an upper end with a through bore 76 extending laterally through the enlarged block 74.

A rear chock 80 has an elongated top portion 82 with a pair of spaced legs 84 extending downwardly from one end thereof. Aligned apertures are formed in the legs 84.

An elongated bolt 85 extends through the apertures in the legs 84 of the rear chock 80 and the bore 76 in the block 74 on the blade 72 to fixedly mount the rear skate 70 to the rear chock 80.

A series of apertures 86 are formed in the top portion 82 of the rear chock 80 and are alignable with correspondingly arranged apertures formed at the second end 22 of the plank 20 and apertures in a cap plate 88. The cap plate 88 is preferably formed of a high strength metallic material, such as aluminum. Likewise, the rear chock 80 is formed of an extruded aluminum. Bolts 90 extend through the aligned apertures in the cap plate 88, the plank 20 and the top portion of the rear chock 80 and receive nuts, not shown, to securely attach each rear chock 80 to one end of the plank 20.

Figure 6:
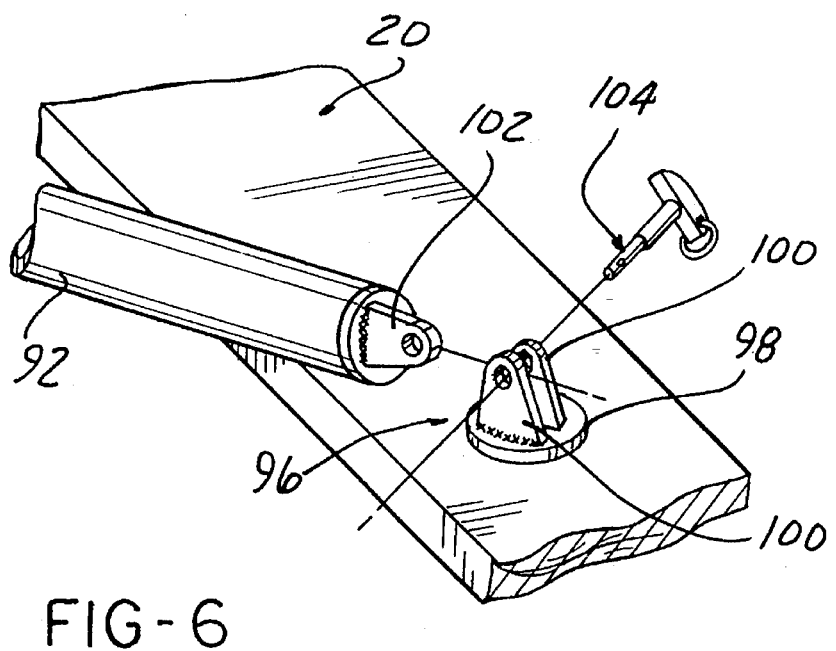
FIG. 6 is a partial, perspective view showing the mounting of one end of a framing strut to the plank.

As shown in FIGS. 1 and 2, and in greater detail in FIG. 6, a pair of framing struts 92 and 94 extend between a fixed connection at one end to the forward end 14 of the hull 12 and a fixed connection at opposite ends, on the plank 20. As the connections at each end of the framing struts 92 and 94 are identical, only one such connection is shown in FIG. 6 and will be described hereafter. A clevis 96 is formed of a planar, disk-shaped base 98 which is fixedly mounted on the plank 20 by means of a nut and bolt extending through a central portion of the base 98. A pair of spaced legs 100 are mounted on the base 98 and project upwardly therefrom. Aligned apertures are formed in the legs 100.

One end of the framing strut 92 has a generally triangular shaped end connector 102 welded thereto. The connector 102 has an aperture extending laterally therethrough which is alignable with the apertures in the legs 100 on the clevis 96 for receiving a fastener 104. The fastener 104 is exemplary depicted as being a conventional aircraft type T-pin having a spring biased ball at one end which releasibly locks the pin 104 through the legs 100 of the clevis 96 and the end connector 102 on the framing strut 92.

Similar clevis mounting connections are provided at the opposite end of the framing strut 92 as well as the other framing strut 94, except that the clevises on the forward ends of the framing struts 92 and 94 are mounted in a staggered or offset position on the springboard 40 in front of the forward end 14 of the hull as shown in FIG. 1.

Figure 7:
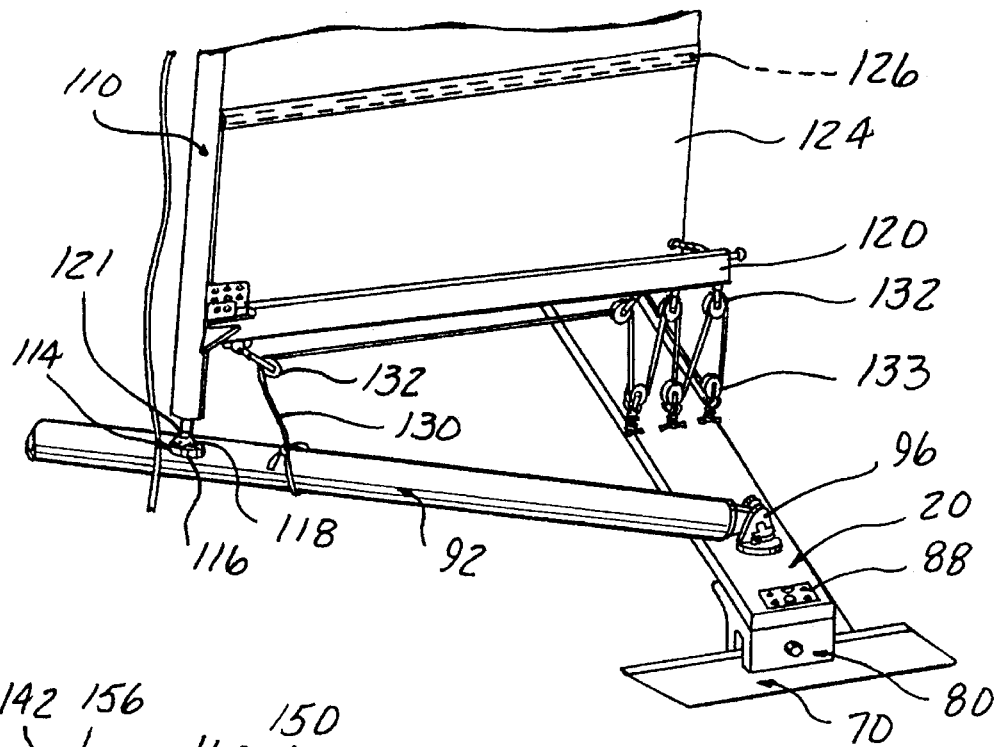
FIG. 7 is a partial, perspective view showing the mounting arrangement of the mast, boom, framing strut and main sail line.

As shown in FIGS. 1 and 2, and in greater detail in FIG. 7, a pair of masts 110 and 112 are rotatably mounted on the framing struts 92 and 94, respectively. A conventional ball and socket connection denoted generally by reference number 114 is used to rotatably connect the lower end of each mast 110 and 112 to the respective framing strut 92 and 94. A generally disk-like member 116 is welded to the framing strut 92 and supports an upwardly projecting ball 118 which rotatably engages a socket 121 fixedly mounted at a lower end of the mast 110. A similar ball and socket mounting arrangement 114 is employed to rotatably mount the other mast 112 to the framing strut 94.

As shown in FIG. 1, the masts 110 and 112 are mounted to the respective framing struts 92 and 94 at a position toward the rear of the hull 12, preferably toward the rear end of the cockpit aperture 18. This moves the forces exerted by sails and masts 110 and 112 to the rear of the hull 12 for a better weight distribution which enables easier turning of the iceboat 10.

A boom 120 is fixedly connected at one end to a lower portion of the mast 110. A similar boom 122 is fixedly secured to a lower end of the other mast 112. Both booms 120 and 122 project rearwardly from the respective mast 110 and 112 toward the plank 120. One sail 124 is slidably mounted in slots formed on the boom 120 and mast 110. An identical sail 124 is mounted to the boom 122 and mast 112. A halyard, not shown, is attached to a pulley mounted at the upper end of each mast 110 and 112 for unfurling and lowering the sails 124 along each mast 110 or 112. Conventional battens 126 are mounted in pockets formed in each sail 124.

A conventional main sheet 130, shown in FIG. 7, extends from a tied connection at one end to the strut 92 and passes through a series of pulleys 132 attached to the boom 120 and the plank 20. The main sheet 130 passes through a lower pulley 133 on the plank 20 toward the hull 12. A similar main sheet 130 and pulley arrangement 132, 133 is also provided for the boom 122 attached to the opposite mast 112.

As shown in FIGS. 1, 2, 3 and 4, each main sheet 130, after passing through the pulley 133 on the plank 20 passes around a pulley 135 mounted in the rear end 16 of the hull 12. The main sheets 130 then pass through the hull 12 to a pulley 137, shown in FIG. 4, mounted on the front end 14 of the hull 12 before extending back toward the cockpit. The ends of the main sheets 130 are joined together and connected to a single line 139, FIG. 1, which is grasped by the occupant to trim the sails 124 in unison to any desired position.

Figure 9:
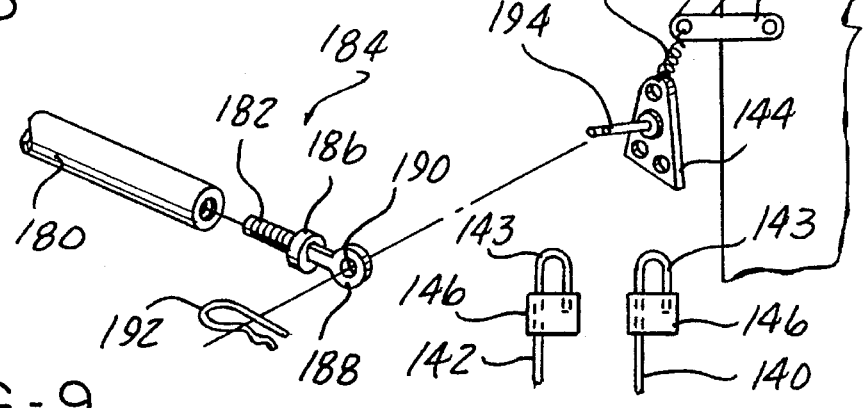

A fore stay 140 and a side stay 142 shown in FIG. 1 are used to support each mast 110 and 112 in an upright position. Each fore stay 140 and side stay 142 is typically formed of a thin cable having suitable mounting connections at opposite ends for attachment to the respective mast 110 and 112, the forward end 14 of the hull 12 and the plank 20. As shown in FIG. 9 for the mast 110, a stay attachment plate 144 is movably connected to the mast 110 by means of a flexible elongated member, such as a chain 196. One end of the chain 196 fixedly engages one aperture in the attachment plate 144. The other end of the chain 196 engages a joint formed at the overlapping ends of a mast hound formed of first and second connected links 198 and 200. The links 198 and 200 are arranged as shown in FIG. 9 and have their opposite ends fixedly connected by means of bolts to the mast 110.

The attachment plate 144 has at least two additional apertures formed therein which receive respective ends of a fore stay 140 and a side stay 142. Each fore stay 140 and side stay 142 has an eye 143 formed at an upper end which projects outwardly from a conventional shackle 146. The eye 143 is releasibly connected through one of the apertures in the mast attachment plate 144.

Figure 8:
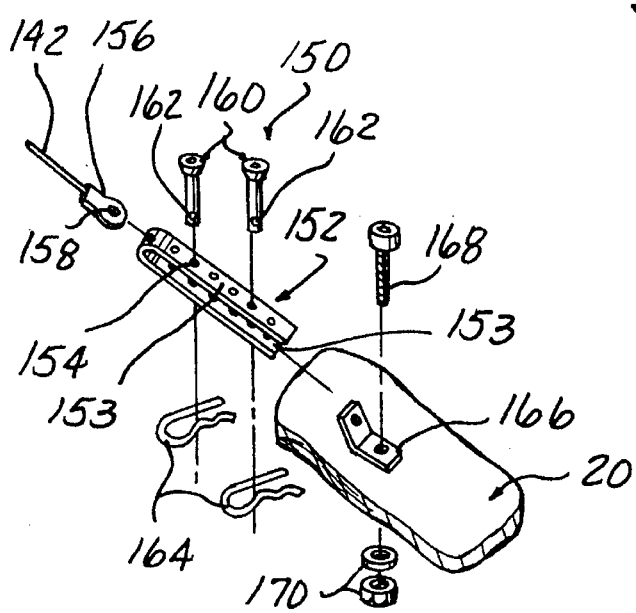
FIGS. 8 and 9 are exploded, perspective views showing the interconnection of the fore stays and side stays to the mast, plank and hull.

The opposite end of each side stay 142 is fixedly connected by an adjustable connector 150, shown in FIG. 8, to the plank 20 adjacent to the rear end 16 of the hull 12 as shown in FIGS. 1 and 2. The adjustable connector 150 is formed of a U-shaped strap 152 having a series of apertures 154 formed in each opposed leg 153. The apertures 154 are aligned with each other. The side stay 142 is initially passed through one of the apertures in the U-shaped strap 152 until a swage fitting 156 fixedly mounted at one end of the side stay 142 is disposed between the spaced legs 153 of the strap 152. An aperture 158 in the swage fitting 156 is alignable with apertures 154 in both spaced legs 153 of the strap 152 and receives a connector 160 therethrough to releasibly connect the side stay 142 to the adjustable connector 150. The connector 160 is, by way of example only, a clevis pin having an enlarged head and an elongated shank with an aperture 162 therein. A releasible fastener, such as a pin 164, is insertable through the aperture 162 after the clevis pin 160 has been passed through the aligned apertures 154 in the strap 152 and the aperture 158 in the swage fitting 156 to securely attach the side stay 142 to the strap 152.

A similar connector arrangement is provided at the opposite free ends of the legs 153 of the strap 152 and includes a clevis pin 160 having an aperture 162 which is releasibly engaged by a pin 164. A tang 166 having an aperture at one end receives the shaft of the clevis pin 160 when the one end of the tang 166 is disposed between the legs 153 of the strap 152. The opposite end of the tang 166 also includes an aperture which receives a bolt 168 therethrough, with the bolt passing through one end of the tang 166 and the plank 20 to a fixed engagement with a washer and nut both denoted by reference number 170.

The adjustable connector 150 enables the tension on the side stay 142 to be adjusted by selecting one of the pairs of aligned apertures 154 in the legs 153 of the strap 152 to receive the clevis pin 160 and the aperture 158 on the swage fitting 156.

A similar adjustable connector 150 is employed for the fore stays 140. In the case of the fore stays 140, a tang 172 is connected at one end to the strap 152 of the adjustable connector 150 and at another end to the bolt used to attach the springboard 40 to the forward end 14 of the hull 12 as shown in FIGS. 1 and 4.

A compression strut 180, generally in the form of an elongated, tubular member, is mounted between the masts 110 and 112 as shown in FIGS. 1 and 2. Each end of the compression strut 180 has an internal threaded bore formed therein which receives the threaded end 182 of a connector 184 as shown in FIG. 9. An enlarged collar 186 is formed adjacent one end of the threaded end 182 to fixedly engage one end of the compression strut 180. The connector 180 terminates in an opposed planar end 184 having an aperture 190 extending therethrough which receives a hitch pin 192. The hitch pin 192 is extendible through the aperture 190 in the end portion 188 of the connector 184 to secure the connector 184 and the attached compression strut 180 to an aperture in an arm 194 projecting upwardly from the stay attachment plate 144.

The compression strut 180 has a length less than the distance between the bottom ends of the masts 110 and 112. This causes one of the masts, such as mast 110, to be disposed at an acute angle less than 90° with respect to the hull 12 and angle toward the other mast 112. When the mast 110 is on the windward side, the angled position of the sail 124 on the mast 110 generates greater downward force on the windward skate 70 which reduces hiking of the skate 70.

In summary, there has been disclosed a unique double mast iceboat which provides improvements in maneuverability, a lighter weight hull due to reduced sail and mast loading, and two sails having a smaller, narrower shape than a conventional single large sail for a lower center of pressure on the hull to reduce hiking and hull load forces. These features enable the hull to be constructed of a smaller size and a overall lighter weight than previous iceboats for an increase in boat speed.

What is claimed is:

1. An iceboat comprising:

a hull having forward and rearward ends;

a plank attached to the rear end of the hull and having first and second opposed ends extending outwardly from opposite sides of the hull;

a plurality of skates, one skate attached to the front end of the hull and one skate attached to each of the first and second ends of the plank;

first and second struts, each extending from a fixed mount on the forward end of the hull to the first and second ends of the plank, respectively;

a first mast and a second mast respectively mounted on the first strut and the second strut; and a sail mounted on each of the first mast and the second mast.

2. The iceboat of claim 1 further comprising:

an aperture in the hull forming an occupant cockpit, the aperture having front and rear ends.

3. The iceboat of claim 2 wherein:

the first and second masts mounted on the first and second struts are positioned behind the front end of the aperture in the hull.

4. The iceboat of claim 3 further comprising:

a compression strut extending between and movably attached to each first and second mast, the compression strut spaced above the hull.

5. The iceboat of claim 4 wherein:

the compression strut has a length less than the spacing between a mounting connection between a bottom end of each first and second mast and one of the first and second struts, the compression strut disposing one of the first and second masts at an angle less than 90° toward the other of the first and second masts.

6. The iceboat of claim 3 further comprising:

a boom connected to each first and second mast and carrying a bottom end of one of the sails;

first and second main sheets, each having first and second ends, the first end fixed to one of the first and second masts and one of the first and second struts and passing through a plurality of pulleys mounted on the boom and the plank;

the second ends of the first and second main sheets joined together to enable identical positioning of the sails on each of the first and second masts.

7. The iceboat of claim 1 wherein:

one of the first and second masts is angled less than 90° toward the opposite first and second mast.

8. The iceboat of claim 1 further comprising:

a compression strut extending between and movably attached to each of the first and second masts, the compression strut spaced above the hull.

9. The iceboat of claim 8 wherein:

the compression strut has a length less than the spacing between a mounting connection between a bottom end of each first and second mast and the respective one of the first and second struts.

10. The iceboat of claim 1 further comprising:

steering means, mounted on the hull and connected to the front skate, for pivoting the front skate.

11. The iceboat of claim 1 further comprising:

a boom connected to each first and second mast and carrying a bottom end of one of the sails;

first and second main sheets, each having first and second ends, the first end fixed to one of the first and second masts and one of the first and second struts and passing through a plurality of pulleys mounted on the boom and the plank;

the second ends of the first and second main sheets joined together to enable identical positioning of the sails on each of the first and second masts.

* * * * *